US012811168B2

(12) United States Patent
Tripathi et al.

(10) Patent No.: US 12,811,168 B2
(45) Date of Patent: Nov. 24, 2026

(54) SYSTEMS AND METHODS FOR MANAGING FLOW AND PRESSURE CROSS COUPLING BETWEEN AIR COMPRESSOR FLOW AND FUEL CELL STACK BACKPRESSURE

(71) Applicants: CUMMINS INC., Columbus, IN (US); HYDROGENICS CORPORATION, Mississauga (CA)

(72) Inventors: Sumit Tripathi, Columbus, IN (US); Richard J. Ancimer, Toronto (CA); Salvatore Ranieri, Etobicoke (CA); Maximilian Muller, Mississauga (CA)

(73) Assignees: CUMMINS INC., Columbus, IN (US); HYDROGENICS CORPORATION, Mississauga (CA)

( * ) Notice: Subject to any disclaimer, the term of this patent is extended or adjusted under 35 U.S.C. 154(b) by 1016 days.

(21) Appl. No.: 18/063,498

(22) Filed: Dec. 8, 2022

(65) Prior Publication Data

US 2023/0187663 A1 Jun. 15, 2023

Related U.S. Application Data

(60) Provisional application No. 63/289,446, filed on Dec. 14, 2021.

(51) Int. Cl.
*H01M 8/04111* (2016.01)
*H01M 8/04014* (2016.01)
(Continued)

(52) U.S. Cl.
CPC .... *H01M 8/04111* (2013.01); *H01M 8/04014* (2013.01); *H01M 8/04358* (2013.01); *H01M 8/04768* (2013.01); *H01M 2250/20* (2013.01)

(58) Field of Classification Search
CPC ......... H01M 8/04111; H01M 8/04014; H01M 8/04358; H01M 8/04768; H01M 8/04077;
(Continued)

(56) References Cited

U.S. PATENT DOCUMENTS

| | | | | |
|---|---|---|---|---|
| 6,815,106 | B1 * | 11/2004 | Salvador ........... | H01M 8/04156 429/444 |
| 2020/0243880 | A1 * | 7/2020 | Farnsworth ....... | H01M 8/04395 |

FOREIGN PATENT DOCUMENTS

| | | |
|---|---|---|
| CN | 112397745 | 2/2021 |

OTHER PUBLICATIONS

Yuan, et al., "A fuzzy extend state observer-based cascade decoupling controller of air supply for vehicular fuel cell system," Energy Conservation and Management, 2021, vol. 236, No. 114080.

(Continued)

*Primary Examiner* — Matthew W Van Oudenaren
(74) *Attorney, Agent, or Firm* — Barnes & Thornburg LLP

(57) ABSTRACT

The present disclosure generally relates to systems and methods in a vehicle or powertrain system including an air stream flowing through an air compressor and an air cooler into a fuel cell stack, an air stream flowing out of the fuel cell stack to an ambient through a backpressure valve, one or more sensors for measuring pressure or temperature in the first air stream or second air stream, and a controller controlling the flow of the first air stream, the flow of the second air stream and the opening of the backpressure valve.

10 Claims, 6 Drawing Sheets

(51) Int. Cl.
*H01M 8/0432* (2016.01)
*H01M 8/04746* (2016.01)

(58) Field of Classification Search
CPC ......... H01M 8/04097; H01M 8/04335; H01M 8/0435; H01M 8/04395; H01M 8/0441; H01M 8/04664; H01M 8/04753; H01M 8/04761; H01M 8/04783; H01M 8/04992; H01M 8/04089; H01M 8/2465; H01M 8/04701; H01M 8/04708; H01M 2250/20
See application file for complete search history.

(56) References Cited

OTHER PUBLICATIONS

Liu, et al., "Feedforward-decoupled closed-loop fuzzy proportion-integral-derivative control of air supply system of proton exchange membrane fuel cell," Energy, 2022, vol. 240, No. 122490.

* cited by examiner

SYSTEMS AND METHODS FOR MANAGING FLOW AND PRESSURE CROSS COUPLING BETWEEN AIR COMPRESSOR FLOW AND FUEL CELL STACK BACKPRESSURE

CROSS-REFERENCE TO RELATED APPLICATIONS

This nonprovisional application claims the benefit and priority, under 35 U.S.C. § 119 (e) and any other applicable laws or statutes, to U.S. Provisional Patent Application Ser. No. 63/289,446 filed on Dec. 14, 2021, the entire disclosure of which is hereby expressly incorporated herein by reference.

TECHNICAL FIELD

The present disclosure relates to systems and methods for optimizing and managing flow and pressure cross coupling between air compressor flow and fuel cell stack backpressure.

BACKGROUND

A fuel cell or fuel cell stack may be powered by a hydrogen-rich, conventional fuel, such as methanol, gasoline, diesel, or gasified coal to generate electricity in the form of direct current (DC) through electro-chemical reactions. A fuel cell based power generating device may include one or more fuel cell stacks, and can be situated wherever power is needed. For example, a fuel cell based power generating device can be configured to generate power in the range of about 200 kW to about 300 kW of power to support a desired application. To supply the necessary power, the fuel cell based power generating device may be designed or configured to function under different environmental and operating conditions, including transient conditions.

To improve the power density of the fuel cell, cathode air is supplied at an elevated pressure of greater than about 1.5 bara by using an air compressor at a cathode inlet and by using a throttle valve at a cathode exhaust. As the throttle valve moves, the valve may create a dynamic disturbance to flow, which, if unchecked, can cause system instability.

The present disclosure is directed to systems and methods that capture a cross coupling of air flow through the air compressor and the fuel cell stack backpressure. The present disclosure also relates to systems and methods that implement a control strategy to deliver a stable transient operation to resolve fluctuations associated with the cross coupling of the air flow through the air compressor and the fuel cell stack backpressure.

SUMMARY

Embodiments of the present invention are included to meet these and other needs. In one aspect, described herein, is a powertrain system. The powertrain system comprises an air compressor and an air cooler connected to a fuel cell stack, a back pressure valve configured to be opened or closed by a controller, and one or more sensors. A first air stream is configured to flow through the air compressor and the air cooler into the fuel cell stack. A second air stream is configured to flow out of the fuel cell stack as a first exhaust stream through the backpressure valve. The one or more sensors are adapted to measure pressure or temperature in the first air stream or the second air stream. The opening of the backpressure valve by the controller is configured to depend on flow rate, pressure, or temperature of the first flow stream and of the second flow stream.

In some embodiments, the powertrain system may further comprise a by-pass valve. A third air stream may be configured to flow through the air compressor, the air cooler, and exit the by-pas valve as the second exhaust stream.

In some embodiments, the controller may implement a cross coupling area term ($A_{CC}$) to minimize instability in the system, where $$A_{CC} = \frac{(K_p e_1 + W_{ref})}{(P_{in} - P_{out})} l.$$

$P_{in}$ may be the pressure of the first air stream entering the fuel cell stack, $P_{out}$ may be the outlet pressure of the second air stream exiting the fuel cell stack, 1 may be a length of controlled space the first air stream is flowing through before exiting the fuel cell stack as the second air stream, $W_{ref}$ may be the reference mass air flow rate, $e_1$ may be the flow error, and $K_p$ may be a control gain. In some embodiments, the cross-coupling area term ($A_{CC}$) may be utilized to resolve the flow error ($e_1$) of about 1 gram/sec while a difference in the stack inlet pressure ($P_{in}$) and the backpressure valve outlet pressure ($P_{out}$) is about 10 kPa. In some embodiments, a combined effective flow area (A) of the fuel cell stack may be determined based on the control gain (Kp).

In some embodiments, the control gain (Kp) may be determined based on total area of the backpressure valve opening ($AV_{TOT}$). In some embodiments, the total area of the backpressure valve opening ($AV_{TOT}$) may be a sum of a nominal valve area ($AV_{NOM}$) and the cross coupling area term ($A_{CC}$). in some embodiments, the cross coupling area term ($A_{CC}$) may be less than or equal to about 4% of the nominal valve area ($AV_{NOM}$).

In some embodiments, a correction factor (CF) may be used to account for oxygen consumption and water vapor production in the fuel cell stack when determining a flow rate of the first air stream ($W_s$), where $$CF = 1 - \frac{W_{O_2}}{W_s} + \frac{W_{H_2O}}{W_s}.$$

$W_{O_2}$ may be the oxygen use rate in the fuel cell stack and $W_{H_2O}$ may be the water production rate in the fuel cell stack.

In another aspect, described herein, is a method of controlling air flow in a powertrain system. The method comprises flowing a first air stream through an air compressor and an air cooler into a fuel cell stack, flowing a second air stream flowing out of the fuel cell stack as a first exhaust stream through a backpressure valve, using one or more sensors for measuring pressure or temperature in the first air stream or second air stream, and controlling the flow of the first air stream, the flow of the second air stream and the opening of the back pressure valve by a controller. The opening of the backpressure valve depends on flow rate, pressure, or temperature of the first flow stream and of the second flow stream.

In some embodiments, the method may further comprise flowing a third air stream through the air compressor, the air cooler, and through a by-pass valve as the second exhaust stream.

In some embodiments, the method may further comprise the controller coupling the first flow stream through the air compressor and the second air stream through the backpressure valve to prevent instability in the system.

In some embodiments, the method may further comprise the controller implementing a control scheme to deliver transient operation and resolve cross coupling between the first flow stream and the second flow stream. The method may further comprise the controller calculating a control gain (Kp) where $$A = \frac{(K_p e_1 + W_{ref})}{(P_{in} - P_{out})} l$$

$$e_1 = W_{ref} - W_s,$$

A may be the combined effective flow area of the fuel cell stack and the backpressure valve, $P_{in}$ may be the pressure of the first air stream entering s the fuel cell stack, $P_{out}$ may be the outlet pressure of the second air stream exiting the fuel cell stack, l may be a length of controlled space the first air stream is flowing through before exiting the fuel cell stack as the second air stream, $W_{ref}$ may be the reference mass air flow rate, $e_1$ may be the flow error, and $W_s$ may be the flow rate of the first air stream.

In some embodiments, the effective flow area (A) may be a sum of a fuel stack area ($A_{ST}$) and a total area of the backpressure valve opening ($AV_{TOT}$). In some embodiments, the total area of the backpressure valve opening ($AV_{TOT}$) may be a sum of a nominal valve area ($AV_{NOM}$) and a cross coupling area term ($A_{CC}$). The cross coupling area term ($A_{CC}$) may be used to resolve the flow error ($e_1$). In some embodiments, the cross coupling area term ($A_{CC}$) may be less than or equal to about 4% of the nominal valve area ($AV_{NOM}$). In some embodiments, the cross coupling area term ($A_{CC}$) is used to resolve the flow error ($e_1$) of about 1 gram/sec while the difference in the stack inlet pressure of $P_{in}$ and the backpressure valve outlet pressure of $P_{out}$ is about 10 kPa.

In some embodiments, a correction factor (CF) may be used to account for oxygen consumption and water vapor production in the fuel cell stack when determining the flow rate of the first air stream ($W_s$), where $$CF = 1 - \frac{W_{O_2}}{W_s} + \frac{W_{H_2O}}{W_s}$$

$W_{O_2}$ may be the oxygen use rate in the fuel cell stack and $W_{H_2O}$ may be the water production rate in the fuel cell stack. In some embodiments, calculating $W_{O_2}$ and $W_{H_2O}$ may comprise using a mole counting method. In some embodiments, the method may further comprise operating the fuel cell stack at a temperature of about 75° C. to about 120° C.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

The present disclosure relates to systems and methods that accounts for the cross coupling between the air flow through an air compressor 120 and a fuel cell stack 12 backpressure. The present disclosure also relates to systems and methods that implement a control strategy to deliver a stable transient operation to resolve fluctuations associated with air flow through the fuel cell stack 12.

Figure 1A:
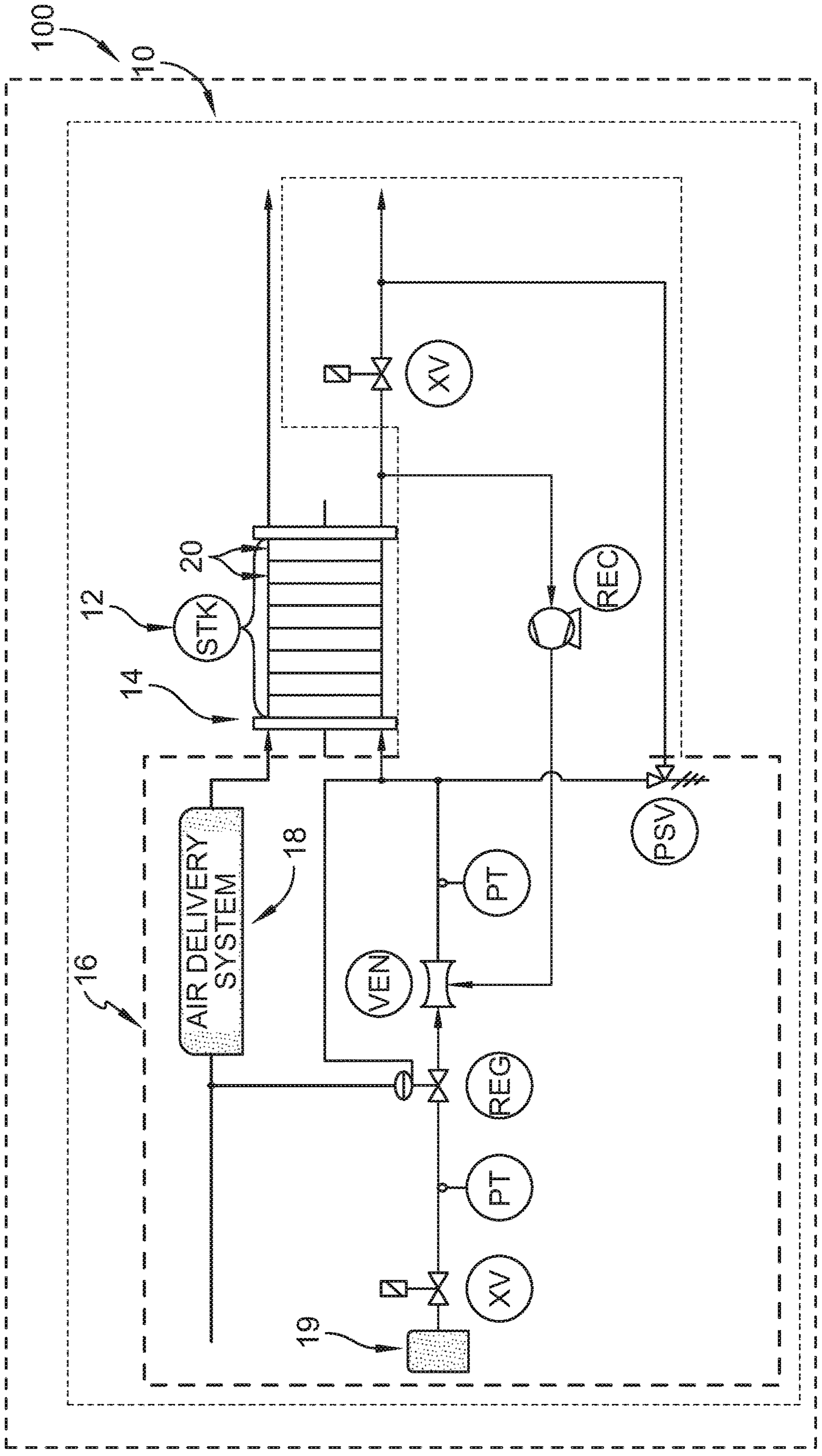
FIG. 1A is a schematic view of an exemplary fuel cell system including an air delivery system, an electrolyzer, and a fuel cell module including a stack of multiple fuel cells.
Figure 1C:
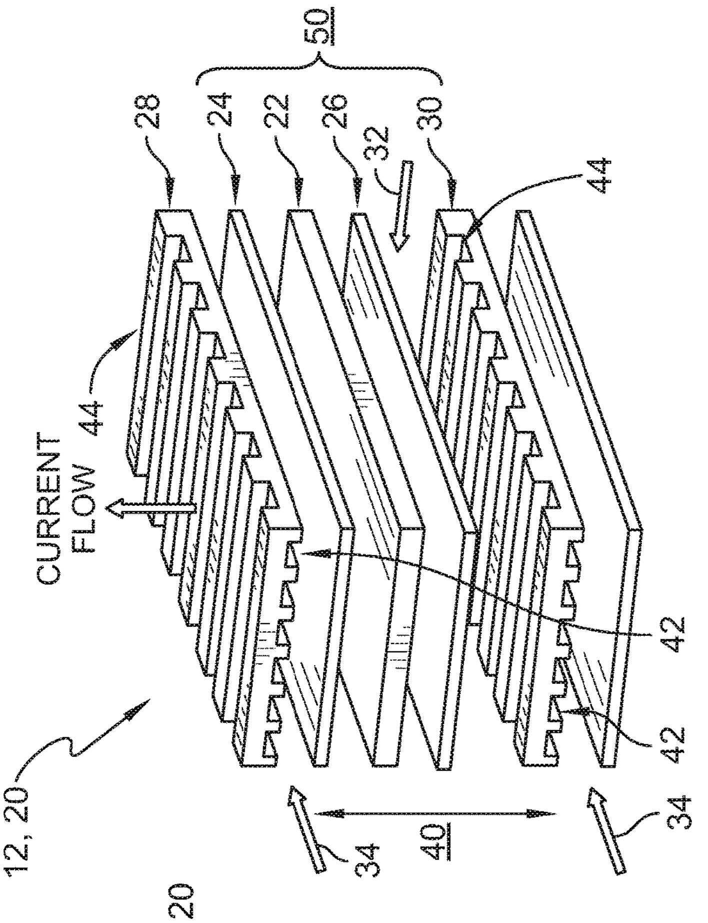
FIG. 1C is a perspective view of an exemplary repeating unit of a fuel cell stack of the fuel cell system of FIG. 1A.
Figure 1B:
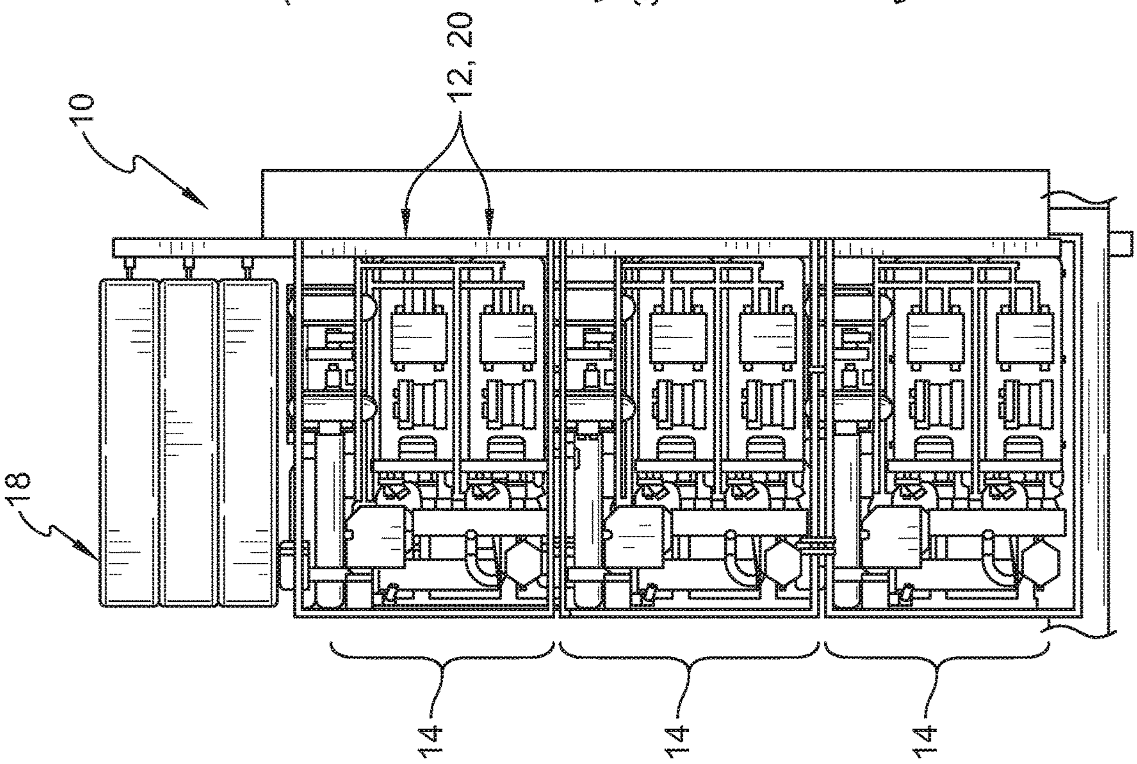
FIG. 1B is a cutaway view of an exemplary fuel cell system including an air delivery system, an electrolyzer, and a plurality of fuel cell modules each including multiple fuel cell stacks.

As shown in FIG. 1A, fuel cell or powertrain systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
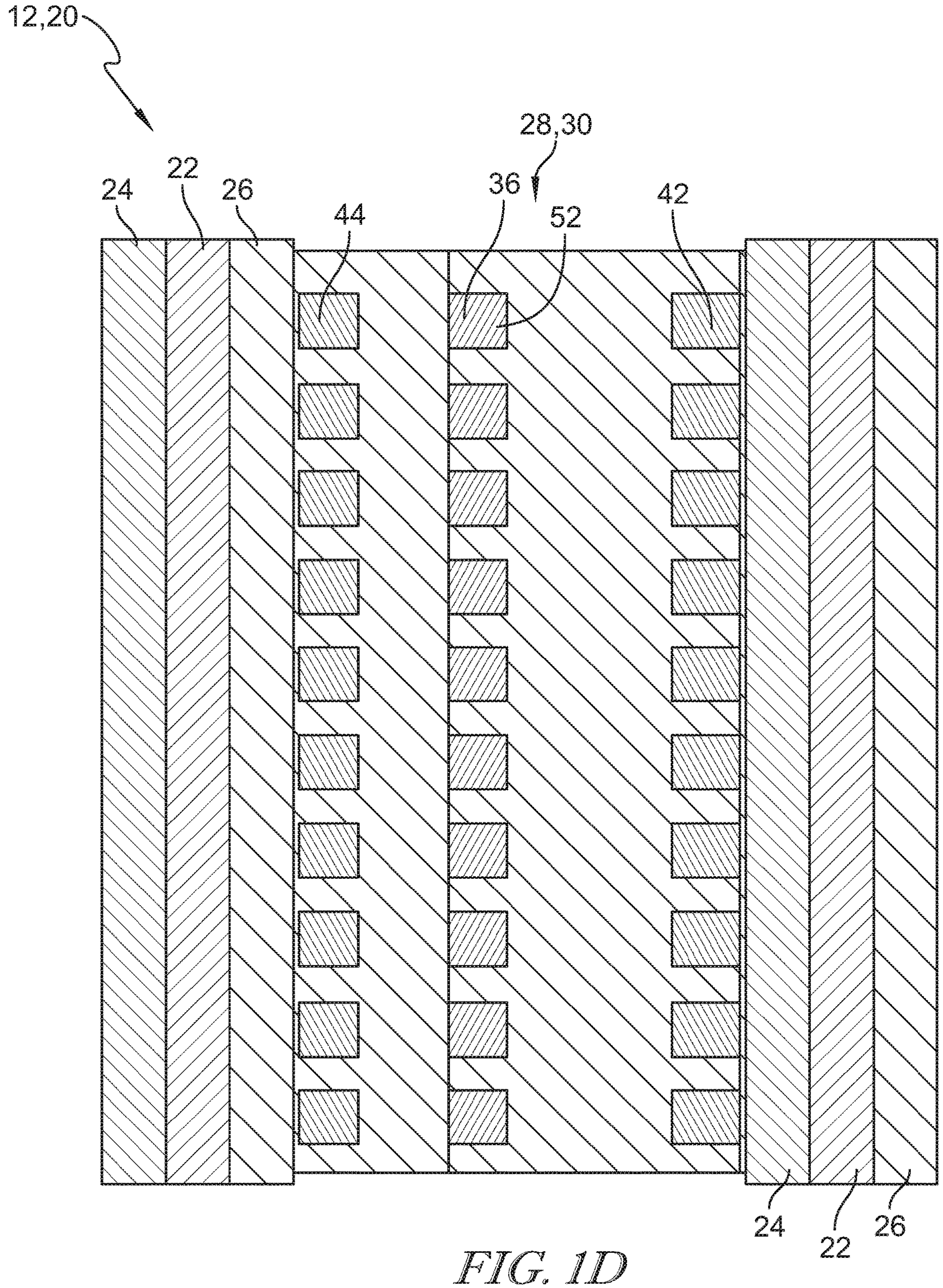
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24.

As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with electrolyzers 19 and/or other electrolysis system 19. In one embodiment, the fuel cell system 10 is connected and/or attached in series or parallel to an electrolysis system 19, such as one or more electrolyzers 19 in the BOP 16 (see FIG. 1A). In another embodiment, the fuel cell system 10 is not connected and/or attached in series or parallel to an electrolysis system 19, such as one or more electrolyzers 19 in the BOP 16.

Figure 2:
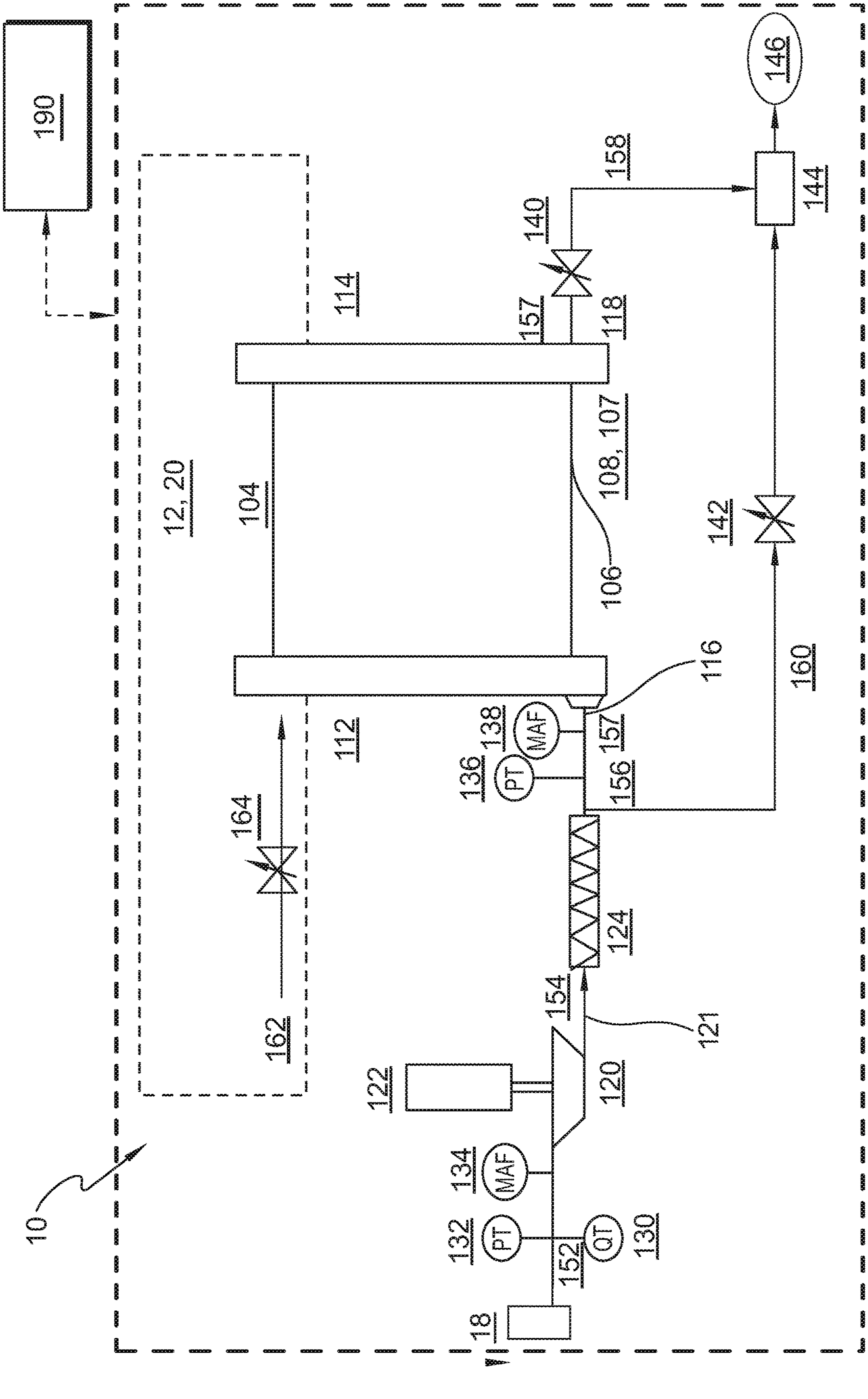
FIG. 2 is a schematic of one embodiment of a fuel cell stack system including an air compressor, a backpressure valve and a by-pass valve.

FIG. 2 illustrates one embodiment of the fuel cell system 10 including the fuel cell stack 12 comprising an anode 104 and a cathode 108. The anode 104 includes a fuel or anode inlet 112 and an anode outlet 114 and the cathode 108 includes an air or cathode inlet 116 and a cathode outlet 118. The fuel cell system 10 includes mass air flow sensors 134, 138, pressure and temperature sensors 132, 136, a humidity sensor 130, an air compressor 120 with a motor 122, an air cooler 124, and one or more variable position throttle valves with angled sensors 140, 142. The variable position throttle valves with angle sensors include a backpressure valve 140 and a by-pass valve 142. In other embodiments, the fuel cell system 10 may comprise one or multiple valves, sensors, coolers, compressors, regulators, blowers, injectors, ejectors, and/or other devices in series or in parallel with the fuel cell stack 12.

The anode side 104 of the fuel cell stack 12 may include a control valve 164 to control the flow of fresh fuel 162 also referred to as primary flow, primary mass flow, primary fuel, or motive flow to the anode 104 comprising an anode inlet 112 and an anode outlet 114. The control valve 164 may be a mechanical regulator (e.g., a dome regulated mechanical regulator), a proportional control valve, or an injector. The control valve 164 may comprise an inner valve, coil, a solenoid, or a different mechanical element that controls the opening or closing of the control valve 164.

Air 152 flows through the air compressor 120 to form a compressed air stream 154. The compressed air stream 154 flows through the cooler 124 to form a cooled air stream 156. A portion of the cooled air stream 156 enters the fuel cell stack 12 as cathode inlet stream 157 at the cathode inlet 116 and exits the fuel cell stack 12 as a cathode exit stream 158 at the cathode outlet 118. The cathode exit stream 158 exiting the fuel cell stack 12 passes through a backpressure valve 140 and exits the fuel cell system 10 as a cathode exhaust stream 144. The cathode exit stream 158 is released into the ambient 146 as the cathode exhaust stream 144. A portion of the cooled air stream 156 passes through the by-pass valve 142 as an air by-pass stream 160 and exits the fuel cell system 10 as a part of the cathode exhaust stream 144.

A controller 190 is configured to operate or control one or more components of the fuel cell system 10. In one embodiment, the controller 190 implements a surge prevention algorithm with or without any cross coupling term to control surge issues arising from air flow through the air compressor 120 and the backpressure valve 140 or the by-pass valve 142.

The cathode inlet stream 157 enters the fuel cell stack 12 with a stack inlet flow rate of $W_s$ (kg/sec) and a stack inlet pressure of $P_{in}$ (Pa). The pressure sensor 136 measures the stack inlet pressure of $P_{in}$ (Pa). The cathode exit stream 158 exits the backpressure valve 140 with a backpressure valve outlet pressure of $P_{out}$ (Pa). The backpressure valve 140 outlet pressure of $P_{out}$ is calculated based on a stack pressure drop table or experimental data such that $P_{out}=P_{in}$-stack pressure drop.

The acceleration of air mass in the streams 156, 157, 158 is $\dot{v}$(m/sec$^2$) and is in the direction of the flow. The combined effective flow area of the fuel cell stack 12 and the backpressure valve 140 is A (m$^2$). The air mass m (kg) in the volume under consideration incudes the air mass in the volume of air cooler 124, the cathode volume in the fuel cell stack 12, the volume in a cathode manifold 107 in the fuel cell stack 12, and the volume in any piping 121 between compressor 120, the air cooler 124, the fuel cell stack 12, the backpressure valve 140, and the cathode exhaust 144. The length of controlled space is l (meters, m), and the air density is ρ (kg/m$^3$).

Figure 3B:
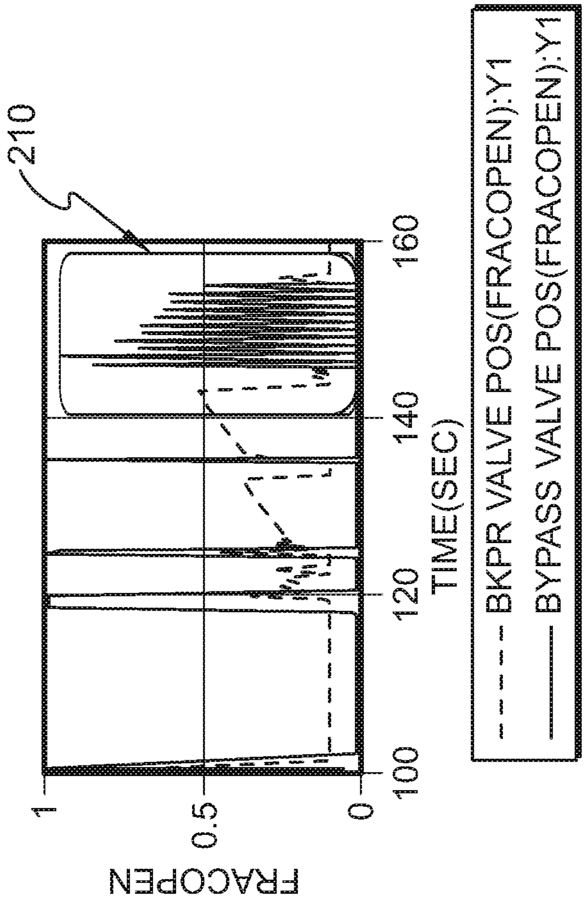
FIG. 3B is a simulation of backpressure valve and a by-pass valve opening during fuel cell stack operation with a controller implementing a surge prevention algorithm that does not have a cross coupling term.
Figure 3A:
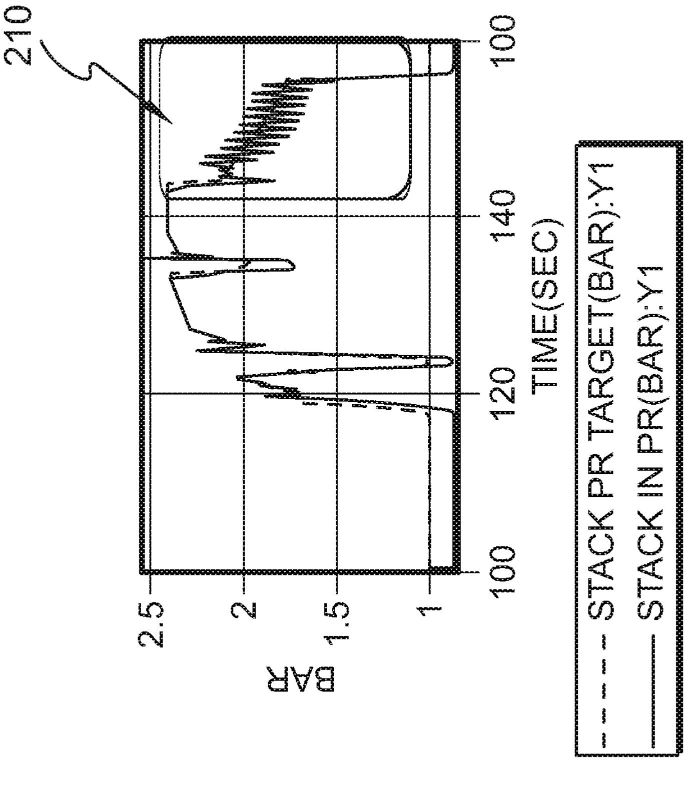
FIG. 3A is a simulation of pressure during fuel cell stack operation with a controller implementing a surge prevention algorithm that does not have a cross coupling term.

FIGS. 3A-B shows a simulation of the fuel cell stack 12 operating with surge issues when the controller 190 implements a surge prevention algorithm without any cross coupling term. The stack pressure oscillates while aligning with the target stack pressure (FIG. 3A). Similarly, as indicated in region 210 of FIG. 3B, implementation of an algorithm without any cross coupling term results in oscillations because the utilization of the backpressure valve 140 creates a dynamic disturbance in the cathode exit stream 158, consequently causing fuel cell system 10 instability.

In one aspect, this disclosure is directed to a method of controlling or managing the air flow through the cathode 108 of the fuel cell stack 12 to determine a stable transient operation. The method includes the controller 190 implementing an algorithm comprising a cross coupling term to resolve the cross coupling between the compressed air flow stream 154 and the stack backpressure at the backpressure valve 140 (See FIG. 2).

The method includes a model based on Newton's second law, $$A(P_{in}-P_{out}) = m\dot{v} = \frac{\dot{W}_s m}{\rho A} = \dot{W}_s l \quad [1]$$

$$\dot{W}_s = \frac{A}{l}(P_{in}-P_{out}) \quad [2]$$

Applying a control law, $Q=\dot{W}_s$:

$$\dot{W}_s = \frac{A}{l}(P_{in}-P_{out}) = Q \quad [3]$$

The control law may be designed such that $$Q = -K_p e + \dot{W}_{ref} \quad [4]$$

$W_{ref}$ is the reference mass air flow rate (kg/sec), and $K_p$ is defined as a control gain.

$$e = -W_{ref} + W_s$$

$$\dot{W}_s = \frac{A}{l}(P_{in}-P_{out}) = Q = -K_p e + \dot{W}_{ref} \quad [5]$$

$$\dot{W}_s - \dot{W}_{ref} + K_p e = 0 \quad [6]$$

$\dot{e}+K_p e=0$, the root of this equation will locate in the left half of s plane and hence, comprise stable controller operation.

The variable $e_1$ is defined as a flow error and is the difference between the air flow request to meet stack current demand, and the measured flow with a mass air flow sensor 138 at the air inlet 116. The flow error (e1) tends to zero once the fuel cell stack 12 operation reaches steady state.

$$e_1 = -e \text{ and } e_1 = W_{ref} - W_s$$

$$\text{The control law states, } A_{CC} = \frac{(K_p e_1 + \dot{W}_{ref})}{(P_{in}-P_{out})} l \quad [7]$$

The control gain (Kp) is dependent on the total area ($AV_{TOT}$) of the opening of the backpressure valve 140. $A_{CC}$ is the cross coupling area term.

The control gain $K_p$ is dependent on the total area ($AV_{TOT}$) of the opening of the backpressure valve 140.

$$A = A_{ST} + AV_{TOT} \quad [8]$$

$$AV_{TOT} = AV_{NOM} + A_{CC} \quad [9]$$

The variable Asr is the stack area and $AV_{NOM}$ is the nominal area and $A_{CC}$ is a cross coupling area term (defined above by equation 7). The nominal area ($AV_{NOM}$) is the instantaneous value of the back-pressure valve 140 opening required to meet the stack cathode air backpressure demand, and may depend on operating conditions. In one embodiment, if the nominal area for a rated operating condition is $AV1_{NOM}$, which is the maximum passible flow area of the back-pressure valve, the cross coupling area term ($A_{CC}$) is less than or equal to about 4% of $AV1_{NOM}$.

Referring to FIG. 2, the bypass valve 142 is managed separately by the controller 190, and may be opened to let excess air escape during surge prevention. The opening of an effective flow area $A_{bypass}$ of the bypass valve 142 is a function of the bypass air temperature and the excess air required to bypass the fuel cell stack 12 to prevent a pressure drop across the bypass valve 142. The effective flow area $A_{bypass}$ of the bypass valve 142 may not affect the back-pressure valve 140 effective flow area calculation.

In one embodiment, the cross coupling area term ($A_{CC}$) is used to resolve the flow error ($e_1$) of about 1 gram/sec while the difference in the stack inlet pressure of $P_{in}$ and the backpressure valve outlet pressure of $P_{out}$, i.e. $P_{in}$-$P_{out}$ is about 10 kPa. The control gain $K_p$ is calculated by using equation [7]. The cross coupling area term can resolve for about −/+15% of the flow error. The cross coupling area term is ignored (forced to zero) during system 10 start up and shut down.

In some embodiments, the oxygen consumption and water vapor production in the fuel cell stack 12 may be accounted for in the calculations described above by modifying $W_s$, and $W_{ref}$ with a correction factor. The oxygen use rate in the fuel cell stack 12 is $W_{O_2}$ (kg/s) and the water production rate in the fuel cell stack 12 is $W_{H_2O}$ (kg/s). The cathode exit stream 158 has a flow rate of $W_{exit}$ (kg/s). The exit air stream is oxygen depleted and has a flow rate of $W_{air_{exit}}$. The cathode exit stream 158 has a mixture of air and water, which may be mathematically decoupled.

$$W_{air_{exit}} = W_s - W_{O_2} \quad [10]$$

$$W_{exit} = W_s - W_{O_2} + W_{H_2O} \quad [11]$$

The correction factor is calculated as shown below.

$$\text{Correction Factor} = \frac{W_{exit}}{W_s} = 1 - \frac{W_{O_2}}{W_s} + \frac{W_{H_2O}}{W_s}$$

$W_{O_2}$, and $W_{H_2O}$ are calculated using a mole counting method:

$$W_{O_2} = \frac{32 \times 10^{-3} \times \text{Stack Current } (I) \times \text{Number of Cells}}{4F} \text{kg/sec} \quad [12]$$

$$W_{H_2O} = \varepsilon \times \frac{18.02 \times 10^{-3} \times \text{Stack Current } (I) \times \text{Number of Cells}}{2F} \text{kg/sec} \quad [13]$$

The stack current (I) is the stack operating current, and the number of cells is the total number of fuel cells 20 in the fuel cell stack 12. Fis Faraday's Constant (96485 C per mole of electrons). ¿ is a cathode side water carry over factor. The majority of the water produced during the operation of the fuel cell stack 12 is removed from the fuel cell stack 12 through the cathode exit stream 158. The water produced is typically in the vapor state. The water may be produced in medium temperature fuel cells 20 or fuel cell stacks 12 operating at a temperature that ranges from about 75° C. to about 95° C., including any temperature or range of temperature comprised therein. Alternatively, the water may be produced in high temperature fuel cells 20 or fuel cell stacks 12 operating at a temperature that ranges from about 95° C. to about 120° C., including any temperature or range of temperature comprised therein.

In some embodiments, the cathode side water carry over factor (¿) is less than 1, indicating that some of the generated water is contained in a stack membrane 106 in the fuel cell stack 12 or alternatively or additionally, the water is carried over to the anode side of the fuel cell stack 12. After operating the fuel cell stack 12 for a certain time period, the water content in the membrane 106 equilibrates to a constant. This time period is described as a time for equilibration. In some embodiments, the time for equilibration may be about 12 minutes to about 20 minutes, including any time or range of time comprised therein. The time for equilibration depends on the stack current density and the active area of the fuel cells 20 in the fuel cell stack 12. Once the water content in the membrane 106 can be estimated as a constant, the water diffused or dragged to the anode side can be measured and used to estimate ¿.

In some embodiments, flow target tracking may be implemented or utilized by the controller 190. Flow target tracking includes the controller 190 adjusting air flow (e.g., air 152) into the fuel cell stack 12 so that stack flow meets a stack flow target to maintain an air flow request needed to meet current demand. Backpressure target tracking includes the controller 190 adjusting the pressure so that stack backpressure, i.e., the cathode inlet air pressure meets a backpressure target needed to maintain stack performance to deliver current at a maximum possible efficiency. Flow target tracking and backpressure target tracking is estimated with appropriate selection or determination of the control gain $K_p$.

For example, suppose the flow error ($e_1$) is allowed to grow in the equation [1], the flow area A also increases. This may result in the cathode exhaust valve i.e. the backpressure valve 140 opening up. Once the air delivery system 18 (e.g., turbomachinery) that supplies the air 152 catches up to meet the flow target, the effective flow area term A may revert to a nominal value ($AV_{NOM}$) such that the $A_{CC}$ term will converge to zero during steady state operation. This may allow the cathode exhaust valve i.e. the backpressure valve 140 to operate in a steady-state position.

Figure 4B:
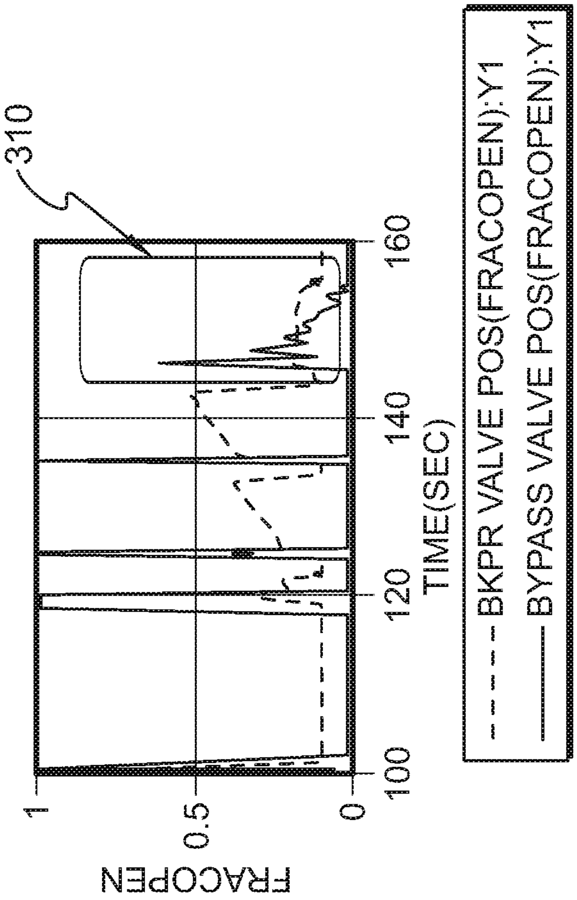
FIG. 4B is a simulation of backpressure valve and a by-pass valve opening during fuel cell stack operation with a controller implementing a surge prevention algorithm that includes a cross coupling term.
Figure 4A:
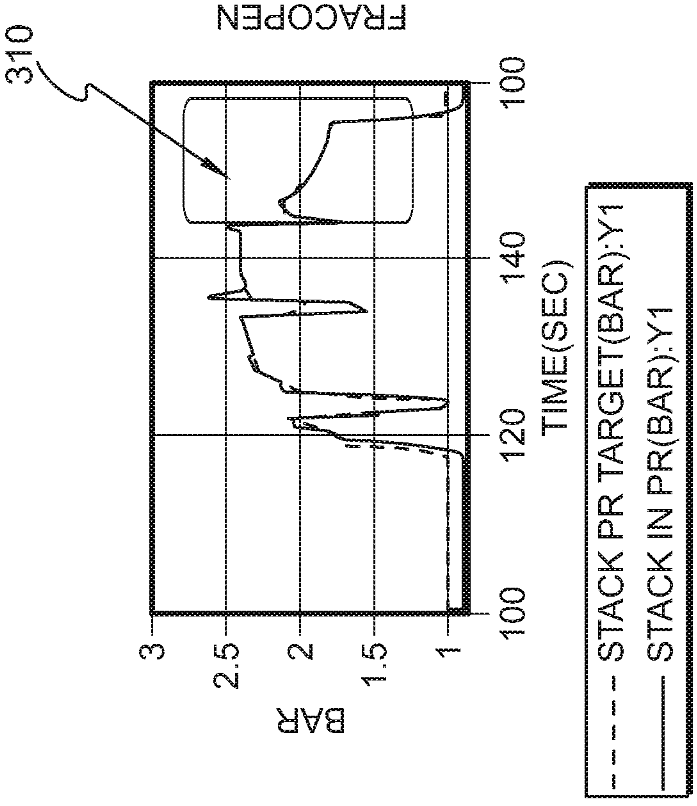
FIG. 4A is a simulation of pressure during fuel cell stack operation with a controller implementing a surge prevention algorithm that includes a cross coupling term.

FIGS. 4A-B illustrate a simulation of operating the fuel cell stack 12 described in FIG. 2 with surge issues when the controller 190 implements a surge prevention algorithm that includes a cross coupling term and a correction factor. Such implementation results in smooth operation as shown in region 310. The stack pressure aligns with the target stack pressure as shown in FIG. 4A. Since the flow and the pressure dynamics are accurately modeled with the cross-coupling term, transitioning near compressor 120 surge does not cause pressure spikes or oscillations. Presence of pressure spikes or oscillations tend to reduce the life of the fuel cell stack 12 and the life of other balance of plant 16 components shown in FIG. 1A. Thus, a smooth operation without sustained oscillations in pressure and flow is preferred and sometimes necessary to increase longevity and performance of the fuel cell system 10.

The bypass valve 142 is typically closed during normal fuel cell system 10 operation. The bypass valve 142 may be configured to open to let excess air escape during surge prevention. If a cross-coupling terms analysis is not used, the opening of the bypass valve 142 may oscillate as shown in FIG. 3B. A similar cross coupling term analysis as discussed above can be applied to control the opening of bypass valve 142. Use of the cross-coupling term may result in the alignment of the opening of the bypass valve 142 with the back pressure valve without the occurrence of oscillations as shown in FIG. 4B.

There are three primary differences when analyzing by utilizing the cross coupling term for bypass valve 142. First, the pressure target in the bypass valve 142 is the maximum allowed compressor 120 pressure output target. A surge pressure ratio line specifies this maximum pressure on a compressor map. A compressor map is a map of compressor steady state operating data in the form of constant speed lines at different air flow corrected to the density of 1 atmospheric pressure and 25° C. air temperature (kg/sec), pressure ratio, and compressor 120 efficiency. Second, the volume calculation includes volume comprised in the air cooler 124 and any corresponding piping 121. The volume calculation may exclude the fuel cell stack 12. Finally, the air mass m (kg) in the volume under consideration is a dry air mass, which is determined without any oxygen depletion or water production in the calculation.

While such correction terms are primarily used in polymer exchange membrane (PEM) fuel cells, they may be used in other fuel cells 20 such as phosphoric acid fuel cells, a molten carbonate fuel cell, or a solid oxide fuel cell (SOFC) that include an air cooler 124 and/or a backpressure valve 140.

The controller 190 may be implemented, in communication with hardware, firmware, software, or any combination thereof present on or outside the fuel cell system 10 comprising the fuel cell stack 12. One or more controller 190 may be configured to control or operate one or more components of the fuel cell system 10. Information may be transferred to the one or more controllers 190 using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

The controller 190 may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The computing device may include an input/output (I/O) subsystem, a memory, a processor, a data storage device, a communication subsystem, a controller, and a display. The computing device may include additional and/or alternative components, such as those commonly found in a computer (e.g., various input/output devices), in other embodiments. In other embodiments, one or more of the illustrative components may be incorporated in, or otherwise form a portion of, another component. For example, the memory, or portions thereof, may be incorporated in the processor.

The following described aspects of the present invention are contemplated and non-limiting:

A first aspect of the present invention relates to a powertrain system. The powertrain system comprises an air compressor and an air cooler connected to a fuel cell stack, a back pressure valve configured to be opened or closed by a controller, and one or more sensors. A first air stream is configured to flow through the air compressor and the air cooler into the fuel cell stack. A second air stream is configured to flow out of the fuel cell stack as a first exhaust stream through the backpressure valve. The one or more sensors are adapted to measure pressure or temperature in the first air stream or the second air stream. The opening of the backpressure valve by the controller is configured to depend on flow rate, pressure, or temperature of the first flow stream and of the second flow stream.

A second aspect of the present invention relates to a method of controlling air flow in a powertrain system. The method comprises flowing a first air stream through an air compressor and an air cooler into a fuel cell stack, flowing a second air stream flowing out of the fuel cell stack as a first exhaust stream through a backpressure valve, using one or more sensors for measuring pressure or temperature in the first air stream or second air stream, and controlling the flow of the first air stream, the flow of the second air stream and the opening of the back pressure valve by a controller. The opening of the backpressure valve depends on flow rate, pressure, or temperature of the first flow stream and of the second flow stream.

In the first aspect of the present invention, the powertrain system may further comprise a by-pass valve. A third air stream may be configured to flow through the air compressor, the air cooler, and exit the by-pas valve as the second exhaust stream.

In the first aspect of the present invention, the controller may implement a cross coupling area term ($A_{CC}$) to minimize instability in the system, where $$A_{CC} = \frac{(K_p e_1 + \dot{W}_{ref})}{(P_{in} - P_{out})} l.$$

$P_{in}$ may be the pressure of the first air stream entering the fuel cell stack, $P_{out}$ may be the outlet pressure of the second air stream exiting the fuel cell stack, I may be a length of controlled space the first air stream is flowing through before exiting the fuel cell stack as the second air stream, $W_{ref}$ may be the reference mass air flow rate, $e_1$ may be the flow error, and Kp may be a control gain. In the first aspect of the present invention, the cross-coupling area term ($A_{CC}$) may be utilized to resolve the flow error ($e_1$) of about 1 gram/sec while a difference in the stack inlet pressure ($P_{in}$) and the backpressure valve outlet pressure ($P_{out}$) is about 10 kPa. In the first aspect of the present invention, a combined effective flow area (A) of the fuel cell stack may be determined based on the control gain (Kp).

In the first aspect of the present invention, the control gain (Kp) may be determined based on total area of the backpressure valve opening ($AV_{TOT}$). In the first aspect of the present invention, the total area of the backpressure valve opening ($AV_{TOT}$) may be a sum of a nominal valve area ($AV_{NOM}$) and the cross coupling area term ($A_{CC}$). in the first aspect of the present invention, the cross coupling area term ($A_{CC}$) may be less than or equal to about 4% of the nominal valve area ($AV_{NOM}$).

In the first aspect of the present invention, a correction factor (CF) may be used to account for oxygen consumption and water vapor production in the fuel cell stack when determining a flow rate of the first air stream ($W_s$), where $$CF = 1 - \frac{W_{O_2}}{W_s} + \frac{W_{H_2O}}{W_s}.$$

$W_{O_2}$ may be the oxygen use rate in the fuel cell stack and $W_{H_2O}$ may be the water production rate in the fuel cell stack.

In the second aspect of the present invention, the method may further comprise flowing a third air stream through the air compressor, the air cooler, and through a by-pass valve as the second exhaust stream.

In the second aspect of the present invention, the method may further comprise the controller coupling the first flow stream through the air compressor and the second air stream through the backpressure valve to prevent instability in the system.

In the second aspect of the present invention, the method may further comprise the controller implementing a control scheme to deliver transient operation and resolve cross coupling between the first flow stream and the second flow stream. The method may further comprise the controller calculating a control gain (Kp) where $$A = \frac{(K_p e_1 + \dot{W}_{ref})}{(P_{in} - P_{out})} l$$

$$e_1 = W_{ref} - W_s,$$

A may be the combined effective flow area of the fuel cell stack and the backpressure valve, $P_{in}$ may be the pressure of the first air stream entering s the fuel cell stack, $P_{out}$ may be the outlet pressure of the second air stream exiting the fuel cell stack, l may be a length of controlled space the first air stream is flowing through before exiting the fuel cell stack as the second air stream, $W_{ref}$ may be the reference mass air flow rate, $e_1$ may be the flow error, and $W_s$ may be the flow rate of the first air stream.

In the second aspect of the present invention, the effective flow area (A) may be a sum of a fuel stack area ($A_{ST}$) and a total area of the backpressure valve opening ($AV_{TOT}$). In the second aspect of the present invention, the total area of the backpressure valve opening ($AV_{TOT}$) may be a sum of a nominal valve area ($AV_{NOM}$) and a cross coupling area term ($A_{CC}$). The cross coupling area term ($A_{CC}$) may be used to resolve the flow error ($e_1$). In the second aspect of the present invention, the cross coupling area term ($A_{CC}$) may be less than or equal to about 4% of the nominal valve area ($AV_{NOM}$). In the second aspect of the present invention, the cross coupling area term ($A_{CC}$) is used to resolve the flow error ($e_1$) of about 1 gram/sec while the difference in the stack inlet pressure of $P_{in}$ and the backpressure valve outlet pressure of $P_{out}$ is about 10 kPa.

In the second aspect of the present invention, a correction factor (CF) may be used to account for oxygen consumption and water vapor production in the fuel cell stack when determining the flow rate of the first air stream ($W_s$), where $$CF = 1 - \frac{W_{O_2}}{W_s} + \frac{W_{H_2O}}{W_s}$$

$W_{O_2}$ may be the oxygen use rate in the fuel cell stack and $W_{H_2O}$ may be the water production rate in the fuel cell stack. In the second aspect of the present invention, calculating $W_{O_2}$ and $W_{H_2O}$ may comprise using a mole counting method. In the second aspect of the present invention, the method may further comprise operating the fuel cell stack at a temperature of about 75° C. to about 120° C.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of controlling air flow in a powertrain system comprising:

flowing a first air stream flowing through an air compressor and an air cooler into a fuel cell stack, flowing a second air stream flowing out of the fuel cell stack as a first exhaust stream through a backpressure valve, using one or more sensors for measuring pressure or temperature in the first air stream or the second air stream, controlling a flow of the first air stream, a flow of the second air stream, and an opening of the backpressure valve by a controller, and implementing a control scheme to deliver transient operation and resolve cross coupling between the first air stream and the second air stream, and calculating a control gain (Kp), $$A = \frac{(K_p e_1 + \dot{W}_{ref})}{(P_{in} - P_{out})} l,$$

$$e_1 = W_{ref} - W_s,$$

wherein A is a combined effective flow area of the fuel cell stack and the backpressure valve, $P_{in}$ is a pressure of the first air stream entering the fuel cell stack, $P_{out}$ is an outlet pressure of the second air stream exiting the fuel cell stack, l is a length of controlled space the first air stream is flowing through before exiting the fuel cell stack as the second air stream, $W_{ref}$ is a reference mass air flow rate, $e_1$ is a flow error, and $W_s$ is a flow rate of the first air stream, and wherein the opening of the backpressure valve depends on flow rate, pressure or temperature of the first air stream and of the second air stream.

2. The method of claim 1, further comprising flowing a third air stream through the air compressor, the air cooler, and through a by-pass valve as a second exhaust stream.

3. The method of claim 1, further comprising the controller coupling the first air stream through the air compressor and the second air stream through the backpressure valve to prevent instability in the powertrain system.

4. The method of claim 1, wherein an effective flow area (A) is a sum of a fuel stack area ($A_{ST}$) and a total area of a backpressure valve opening ($AV_{TOT}$).

5. The method of claim 4, wherein the total area of the backpressure valve opening ($AV_{TOT}$) is a sum of a nominal valve area ($AV_{NOM}$) and a cross coupling area term ($A_{CC}$), and wherein the cross coupling area term ($A_{CC}$) is used to resolve the flow error ($e_1$).

6. The method of claim 5, wherein the cross coupling area term ($A_{CC}$) is less than or equal to 4% of the nominal valve area ($AV_{NOM}$).

7. The method of claim 5, wherein the cross coupling area term ($A_{CC}$) is used to resolve the flow error ($e_1$) of 1 gram/sec while a difference in a stack inlet pressure of $P_{in}$ and a backpressure valve outlet pressure of $P_{out}$ is 10 kPa.

8. The method of claim 1, wherein a correction factor (CF) is used to account for oxygen consumption and water vapor production in the fuel cell stack when determining the flow rate of the first air stream ($W_s$) by $$CF = 1 - \frac{W_{O_2}}{W_s} + \frac{W_{H_2O}}{W_s}$$

wherein $W_{O_2}$ is an oxygen use rate in the fuel cell stack and $W_{H_2O}$ is a water production rate in the fuel cell stack.

9. The method of claim 8, wherein the method comprises determining $W_{O_2}$ and $W_{H_2O}$ by using a mole counting method.

10. The method of claim 8, further comprising operating the fuel cell stack at a temperature of 75° C. to 120° C.

* * * * *